United States Patent
Casci et al.

(10) Patent No.: US 10,940,466 B2
(45) Date of Patent: Mar. 9, 2021

(54) AEI ZEOLITE SYNTHESIS

(71) Applicant: JOHNSON MATTHEY PUBLIC LIMITED COMPANY, London (GB)

(72) Inventors: John Leonello Casci, Billingham (GB); David Lang, Wayne, PA (US); Sanyuan Yang, Savannah, GA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/916,933

(22) Filed: Mar. 9, 2018

(65) Prior Publication Data

US 2018/0193824 A1 Jul. 12, 2018

Related U.S. Application Data

(63) Continuation of application No. 14/529,647, filed on Oct. 31, 2014, now Pat. No. 9,919,296.

(60) Provisional application No. 61/898,155, filed on Oct. 31, 2013, provisional application No. 61/907,615, filed on Nov. 22, 2013.

(51) Int. Cl.
| | |
|---|---|
| *C01B 39/48* | (2006.01) |
| *B01J 29/70* | (2006.01) |
| *B01J 29/76* | (2006.01) |
| *B01J 29/78* | (2006.01) |

(52) U.S. Cl.
CPC ............ *B01J 29/70* (2013.01); *B01J 29/76* (2013.01); *B01J 29/78* (2013.01); *C01B 39/48* (2013.01); *C01P 2004/54* (2013.01); *C01P 2004/61* (2013.01); *C01P 2004/62* (2013.01)

(58) Field of Classification Search
CPC .. C01B 39/48; B01J 29/70; B01J 29/76; B01J 29/78; C01P 2004/54; C01P 2004/60; C01P 2004/61; C01P 2004/62
See application file for complete search history.

(56) References Cited

U.S. PATENT DOCUMENTS

| | | | |
|---|---|---|---|
| 4,713,227 A | 12/1987 | Derouane et al. | |
| 5,624,658 A | 4/1997 | Fitoussi et al. | |
| 5,637,287 A | 6/1997 | Vaughan et al. | |
| 8,932,973 B2 * | 1/2015 | Andersen ............ | B01D 53/9418 502/214 |
| 9,034,269 B2 * | 5/2015 | Hilgendorff ......... | B01J 37/0244 422/170 |
| 9,044,744 B2 * | 6/2015 | Casci ................. | B01D 53/9418 |
| 9,242,238 B2 * | 1/2016 | Mohanan ................ | B01J 29/80 |
| 9,919,296 B2 * | 3/2018 | Yang ...................... | B01J 29/70 |
| 2005/0096214 A1 | 5/2005 | Janssen et al. | |
| 2005/0233895 A1 | 10/2005 | Mertens et al. | |
| 2006/0100095 A1 | 5/2006 | Mertens et al. | |
| 2006/0292053 A1 | 12/2006 | Mertens et al. | |
| 2006/0293547 A1 | 12/2006 | Mertens | |
| 2007/0149836 A1 | 6/2007 | Chang et al. | |
| 2007/0203385 A1 | 8/2007 | Chang et al. | |
| 2008/0159952 A1 | 7/2008 | Miller et al. | |
| 2011/0250127 A1 | 10/2011 | Andersen | |
| 2014/0271426 A1 * | 9/2014 | Casci ................. | B01D 53/9418 423/213.2 |
| 2016/0144347 A1 | 5/2016 | Sano et al. | |
| 2017/0368541 A1 * | 12/2017 | Trukhan ................ | B01J 29/763 |

FOREIGN PATENT DOCUMENTS

| | | |
|---|---|---|
| CN | 102190312 A | 9/2011 |
| EP | 0887310 A1 | 12/1998 |
| EP | 3020687 A1 | 5/2016 |
| JP | H1111938 A | 1/1999 |
| JP | 2005-075702 A | 3/2005 |
| JP | 2006-273710 A | 2/2006 |
| WO | WO 02070407 A1 | 9/2002 |
| WO | 2005063624 A1 | 7/2005 |
| WO | WO 2008097481 A1 | 8/2008 |
| WO | 2013092707 A1 | 6/2013 |
| WO | WO 2013159825 A1 | 10/2013 |

OTHER PUBLICATIONS

Moliner et al.,"Cu-SSZ-39, an active and hydrothermally stable catalyst for the selective catalytic reduction of NOx", (including Supplemental Information) Chem. Commun, 48, pp. 8264-8266 (Jun. 2012) (Year: 2012).*
Wagner et al., Guest/Host Relationships in the Synthesis of the Novel Cage-Based Zeolites SSZ-35, SSZ-36, and SSZ-39, J.Am. Chem.Soc. 2000, 122, 263-273.

* cited by examiner

*Primary Examiner* — David M Brunsman

(57) ABSTRACT

A novel method for synthesizing AEI zeolites is provided which results in high overall relative yields on silica and the structure directing agent.

8 Claims, 2 Drawing Sheets

AEI ZEOLITE SYNTHESIS

CROSS-REFERENCE TO RELATED APPLICATIONS

This application is a continuation of U.S. patent application Ser. No. 14/529,647, filed Oct. 31, 2014, allowed on Nov. 9, 2017, and claims priority to U.S. Provisional Patent Applications No. 61/898,155, filed Oct. 31, 2013 and 61/907,615, filed Nov. 22, 2013, the disclosures of which are incorporated herein by reference in their entireties for all purposes

FIELD OF INVENTION

The present invention relates to a method for synthesizing a molecular sieve having an AEI framework. The invention also relates to a unique molecular sieve produced by the method, as well as the molecular sieve's use as a catalyst.

BACKGROUND

Zeolites are crystalline or quasi-crystalline aluminosilicates constructed of repeating $SiO_4$ and $AlO_4$ tetrahedral units. These units are linked together to form frameworks having regular intra-crystalline cavities and channels of molecular dimensions. Numerous types of synthetic zeolites have been synthesized and each has a unique framework based on the specific arrangement its tetrahedral units. By convention, each framework type is assigned a unique three-letter code (e.g., "AEI") by the International Zeolite Association (IZA).

Zeolites have numerous industrial applications, and zeolites of certain frameworks, such as AEI, are known to be effective catalyst for treating combustion exhaust gas in industrial applications including internal combustion engines, gas turbines, coal-fired power plants, and the like. In one example, nitrogen oxides ($NO_x$) in the exhaust gas may be controlled through a so-called selective catalytic reduction (SCR) process whereby $NO_x$ compounds in the exhaust gas are contacted with a reducing agent in the presence of a zeolite catalyst.

Synthetic AEI zeolites are produced using a structure directing agent (SDA), also referred to as a "template" or "templating agent". SDAs are typically complex organic molecules which guide or direct the molecular shape and pattern of the zeolite's framework. Generally, the SDA serves as a mold around which the zeolite crystals form. After the crystals are formed, the SDA is removed from the interior structure of the crystals, leaving a molecularly porous aluminosilicate cage.

In typical synthesis techniques, solid zeolite crystals precipitate from a reaction mixture which contains the framework reactants (e.g., a source of silica and a source of alumina), a source of hydroxide ions (e.g., NaOH), and an SDA. Such synthesis techniques usually take several days (depending on factors such as crystallization temperature) to achieve the desired crystallization. When crystallization is complete, the solid precipitate containing the zeolite crystals is filtered off and the remaining mother liquor is discarded. This discarded mother liquor contains unused SDA, which is often degraded due to harsh reaction conditions.

Known SDAs for use in AEI zeolite synthesis are relatively expensive and contribute to a substantial portion of the cost of manufacturing the zeolite. In addition, conventional methods for synthesizing zeolite AEI have a relatively poor yield on silica (a key component of the reaction mixture) which also impacts manufacturing costs. Accordingly, it would be desirable to reduce the cost of the synthesis process, preferably by a means that has a low impact on the environment. This invention satisfies this need amongst others.

SUMMARY

Applicants have discovered certain means for increasing the relative yield on silica and/or SDA in an AEI zeolite synthesis process. As used herein, the term "relative yield" with respect to a chemical reactant, means the amount of the reactant (or derivative thereof) that is incorporated into a desired product as a fraction of the total amount of reactant introduced into the chemical process. Thus, the relative yield of a reactant can be calculated as follows:

$$(\text{Relative Yield})_R = (R_P)/(R_T)$$

where R is the reactant, $R_P$ is the total weight of reactant R (or derivative thereof) incorporated into the desired product, and $R_T$ is total weight of reactant R introduced into the chemical process. Here, the relative yield serves to measure the effectiveness of the chemical process in utilizing the reactant. The term "overall relative yield" means the relative yield for a chemical process as a whole, including for example, multiple sequential zeolite synthesis batch reactions. Thus, the overall relative yield on silica represents the total amount of silica that is incorporated into the total amount of zeolite produced across one or more sequential batches (vis-á-vis the amount of silica remaining in a discarded mother liquor) relative to the total amount of silica introduced into the process as a whole. Likewise, the overall relative yield on SDA represents the amount of SDA that is directly used in constructing the zeolite framework across one or more sequential batches (vis-á-vis the amount of SDA remaining in a discarded mother liquor) relative to the amount of silica introduced into the process as a whole. The total amounts of these materials typically correspond to the material's total weight.

In certain aspects of the invention, the relative yield of silica and/or a SDA in an AEI zeolite synthesis process is increased by recovering the mother liquor at the end of a zeolite crystallization reaction and re-using the mother liquor in a subsequent zeolite crystallization reaction. As used herein, "mother liquor" is the non-precipitated portion of the reaction mixture that remains after crystallization. In some embodiments, the mother liquor is the remaining portion of the reaction mixture after the zeolite crystals have been filter out or otherwise separated. Thus, the mother liquor comprises only a portion of the original solute, with most of the remainder being incorporated into the precipitate.

Mother liquors generated by conventional AEI zeolite synthesis processes contain degraded SDAs and generally cannot be reused. However, the present inventors have discovered that certain SDAs are resistant to degradation and thus are reusable in subsequent zeolite synthesis batches. SDA's useful in the present invention include the cations N,N-Dimethyl-3,5-dimethylpiperidinium, N,N-Dimethyl-2-(2-hydroxyethyl)piperidinium, N,N-Dimethyl-2-ethylpiperidinium, and 2,2,4,6,6-Pentamethyl-2-azoniabycyclo[3.2.1]octane. Surprisingly, these SDAs retain their effectiveness even after portions of the mother liquor have been reused several times.

Accordingly, provided is a zeolite synthesis method comprising the steps of (a) forming an AEI zeolite reaction admixture comprising a mother liquor, or portion thereof, from an AEI synthesis process, wherein the mother liquor, or portion thereof, comprises an AEI structure directing agent; (b) reacting the admixture under crystallization conditions to form a batch of zeolite crystals having an AEI framework and a subsequent mother liquor; and optionally (c) separating the zeolite crystals having an AEI framework from the subsequent mother liquor; and (d) using the subsequent mother liquor, or a portion thereof, to synthesize one or more sequential batches of zeolite crystals having an AEI framework. Preferably, the re-use of the mother liquor in a series of sequential AEI zeolite synthesis batch reactions results in an overall relative yield on silica of at least about 60 percent and/or an overall relative yield on structure directing agent of at least about 40 percent.

In another aspect of the invention, provided is a method for achieving a high overall relative yield on silica in an AEI zeolite synthesis process comprising the steps of (a) preparing an admixture comprising (i) at least one source of aluminum, (ii) at least one source of silica, (iii) at least one source of hydroxide ions, and (iv) an AEI structured directing agent (SDA); and (b) reacting the admixture under crystallization conditions to form zeolite crystals having an AEI framework with a silica-to-alumina ratio (SAR) of about 8 to about 50, and a mother liquor, wherein the reacting results in an overall relative yield on silica of at least about 60 percent.

In yet another aspect of the invention, provided is a novel aluminosilicate zeolite crystals having an AEI framework, an aspect ratio (L/D) of less than about 3, and optionally a silica-to-alumina ratio of about 8 to 50.

DETAILED DESCRIPTION

In one aspect, the present invention is an improved method for synthesizing AEI zeolites. Preferably, the invention involves the use of certain reactants to improve the relative yield on silica and/or SDA compared to the use of conventional reactants. In one example, the overall relative yield can be improved by the selection of SDAs that can be effectively recycled, thus decreasing the overall amount of SDA required for a sequential multi-batch AEI synthesis process.

In certain embodiments, the method comprises the sequential steps of (a) forming an AEI zeolite reaction admixture comprising a mother liquor from an AEI synthesis process, wherein the mother liquor comprises an AEI structure directing agent; and (b) reacting the admixture under crystallization conditions to form a batch of zeolite crystals having an AEI framework and a subsequent mother liquor. The precipitated zeolite crystals are preferably separated from the subsequent mother liquor by any conventional technique, such as filtration. To improve the overall efficiency of the process, the subsequent mother liquor, or a portion thereof, is used to synthesize one or more sequential batches of zeolite crystals having an AEI framework.

As used herein, the term "AEI" refers to an AEI type framework as recognized by the International Zeolite Association (IZA) Structure Commission and the term "AEI zeolite" means an aluminosilicate in which the primary crystalline phase is AEI. In certain embodiments, other crystalline phases such as FAU may also be present, but the primary crystalline phase comprises at least about 90 weight percent AEI, preferably at least about 95 weight percent AEI, and even more preferably at least about 98 or at least about 99 weight percent AEI. The molecular sieve may contain FAU in minor amounts, preferably less than 5 weight percent, and even more preferably less than about 2 weight percent, or even less than about 1 weight percent. Preferably, the AEI molecular sieve is substantially free of other crystalline phases and is not an intergrowth of two or more framework types. By "substantially free" with respect to other crystalline phases, it is meant that the molecular sieve contains at least 99 weight percent AEI.

As used herein the term "zeolite" means a synthetic aluminosilicate molecular sieve having a framework constructed of alumina and silica (i.e., repeating $SiO_4$ and $AlO_4$ tetrahedral units), and preferably having a silica-to-alumina ratio (SAR) of at least 8, for example about 8 to about 50.

The zeolites of the present invention are not silica-aluminophosphates (SAPOs) and thus do not have an appreciable amount of phosphorous in their framework. That is, the zeolite frameworks do not have phosphorous as a regular repeating unit and/or do not have an amount of phosphorous that would affect the basic physical and/or chemical properties of the material, particularly with respect to the material's capacity to selectively reduce $NO_x$ over a broad temperature range. In certain embodiments, the amount of framework phosphorous is less than 0.1 weight percent, preferably less than 0.01 or less than 0.001 weight percent, based on the total weight of the zeolite.

Zeolites, as used herein, are free or substantially free of framework metals, other than aluminum. Thus, a "zeolite" is distinct from a "metal-substituted zeolite", wherein the latter comprises a framework that contains one or more non-aluminum metals substituted into the zeolite's framework. In certain embodiments, the zeolite framework, or the zeolite as a whole, is free or essentially free of transition metals, including copper, nickel, zinc, iron, tungsten, molybdenum, cobalt, titanium, zirconium, manganese, chromium, vanadium, niobium, as well as tin, bismuth, and antimony; is free or essentially free of noble metals including platinum group metals (PGMs), such as ruthenium, rhodium, palladium, indium, platinum, and precious metals such as gold and silver; and is free or essentially free of rare earth metals such as lanthanum, cerium, praseodymium, neodymium, europium, terbium, erbium, ytterbium, and yttrium.

Zeolites synthesized by the present method may include one or more non-framework alkali and/or alkaline earth metals. These metals are typically introduced into the reaction mixture in conjunction with the source of hydroxide ions. Examples of such metals include sodium and potassium, and also magnesium, calcium, strontium, barium, lithium, cesium, and rubidium.

Usually it is desirable to remove the alkali metal cation by ion exchange and replace it with hydrogen, ammonium, or any desired metal ion. Accordingly, zeolites of the present invention may be a Na-form zeolite, a K-form zeolite, and the like, or may be an H-form zeolite, an ammonium-form zeolite, or a metal-exchanged zeolite. Typical ion exchange techniques involve contacting the synthetic zeolite with a solution containing a salt of the desired replacing cation or cations. Although a wide variety of salts can be employed, chlorides and other halides, nitrates, and sulfates are particularly preferred. Representative ion exchange techniques are widely known in the art. Ion exchange occurs post-synthesis and can take place either before or after the zeolite is calcined. Following contact with the salt solution of the desired replacing cation, the zeolite is typically washed with water and dried at temperatures ranging from 65° C. to about 315° C. After washing, the zeolite can be calcined in air or inert gas at temperatures ranging from about 200° C. to 820° C. for periods of time ranging from 1 to 48 hours, or more, to produce a catalytically active and stable product.

The zeolite reaction admixture and/or the mother liquor derived from an AEI synthesis process typically contain at least one source of silica, at least one source of alumina, at least one SDA useful in forming an AEI framework, and at least one source of hydroxide ions. It is understood, however, that the synthesis method described herein is not necessarily limited to aluminosilicates, but can also be applied to synthesize other molecular sieves having an AEI structure such as ferrosilicates, titanosilicates, vanadosilicates, and borosilicates. Thus, more generally, the reaction mixture from which molecular sieves are crystallized comprises at least one active source of a tetravalent oxide or mixture of tetravalent oxides (e.g., silicon oxide, germanium oxide or mixtures thereof) and at least one trivalent oxide or mixtures of trivalent oxides (e.g., aluminum oxide, boron oxide, gallium oxide, vanadium oxide, iron oxide or mixtures thereof).

Figure 1A:
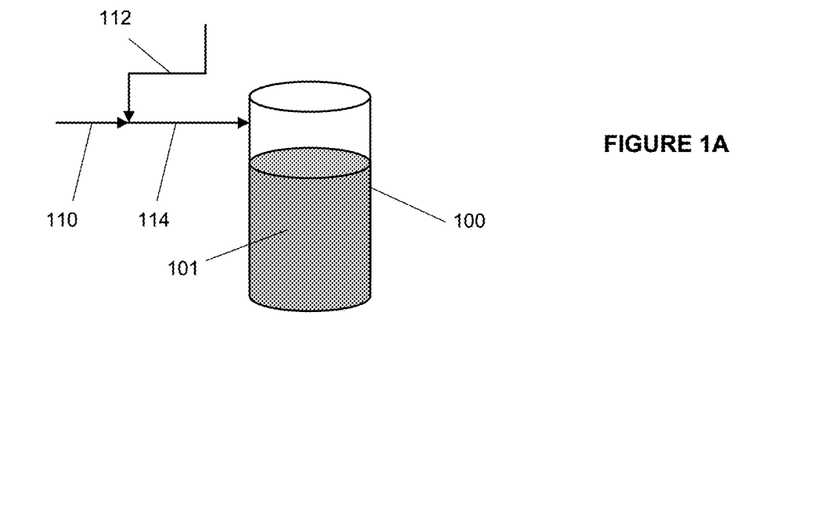
FIGS. 1A-C depict an embodiment of the invention that utilizes a mother liquor recycle.
Figure 1B:
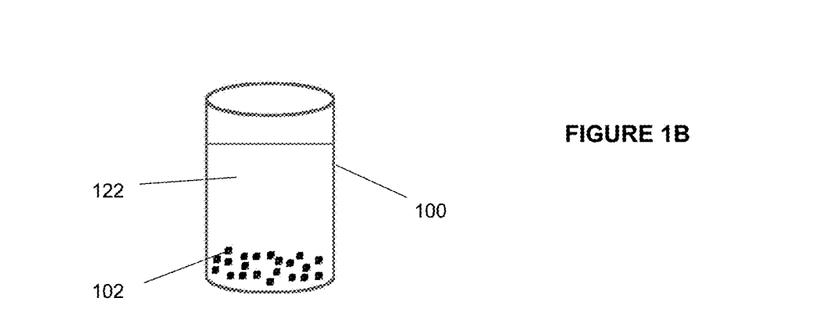
Figure 1C:
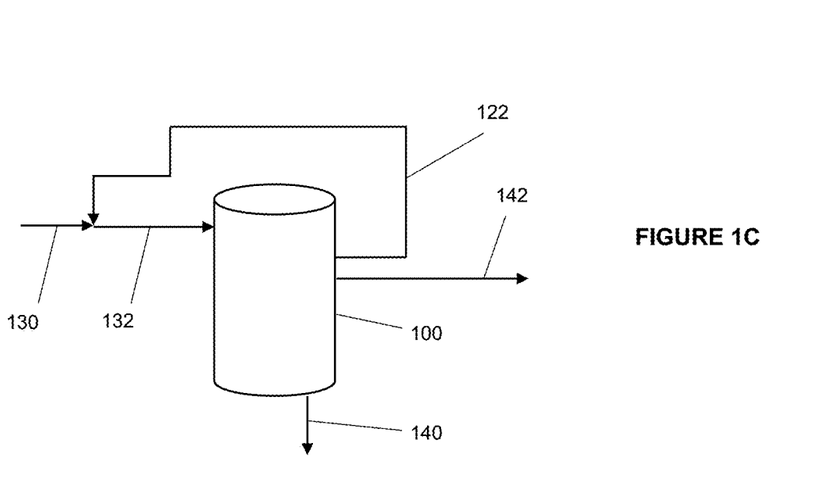

Turning to FIGS. 1A-C, shown is a method according to an embodiment of the invention. Here, an AEI zeolite reaction mixture 114 comprising a mother liquor from an AEI synthesis process 112 is reacted in a reactor 100 under crystallization conditions to form a batch of zeolite crystals having an AEI framework 102 and a subsequent mother liquor 122. In another embodiment, the method further comprises the steps of separating the zeolite crystals having an AEI framework 102 from the subsequent mother liquor 122 and using the subsequent mother liquor 122, or a portion thereof, to synthesize one or more sequential batches of zeolite crystals having an AEI framework. Preferably, the mother liquor 112 and the subsequent mother liquor 122 contain at least one SDA useful for forming an AEI zeolite. The mother liquor 112 and/or the subsequent mother liquor 122 can further comprise at least one source of silica, at least one source of alumina, and at least one source of hydroxide ions. To achieve a desirable proportion of reactants in the admixture 114, the mother liquor 112 can be combined with a feed stream 110 containing at least one source of silica, at least one source of alumina, at least one SDA useful in forming an AEI framework, and/or at least one source of hydroxide ions. Likewise, the subsequent mother liquor 122 may be combined with a replenishment feed 130 containing at least one source of silica, at least one source of alumina, at least one SDA useful in forming an AEI framework, and/or at least one source of hydroxide ions to achieve a proper balance of reactants. Typically, the feed stream 110 and/or 130 will contain a source of silica, a source of alumina, and a source of SDA in an amount equivalent to the amount of these components that are removed from the reactor as a participate (e.g., are incorporated into the zeolite crystals).

In one embodiment, the subsequent mother liquor 122 remains in the reactor and receives a replenishment feed. This second AEI zeolite reaction mixture is then reacted in reactor 100 under crystallization conditions to form a sequential batch of zeolite crystals having an AEI framework. An alternative embodiment is shown in FIG. 10 wherein the subsequent mother liquor 122 is removed from the reactor 100 and mixed with a replenishment feed 130 to form a second AEI zeolite reaction mixture 132 prior to entering the reactor 100.

Figure 2:
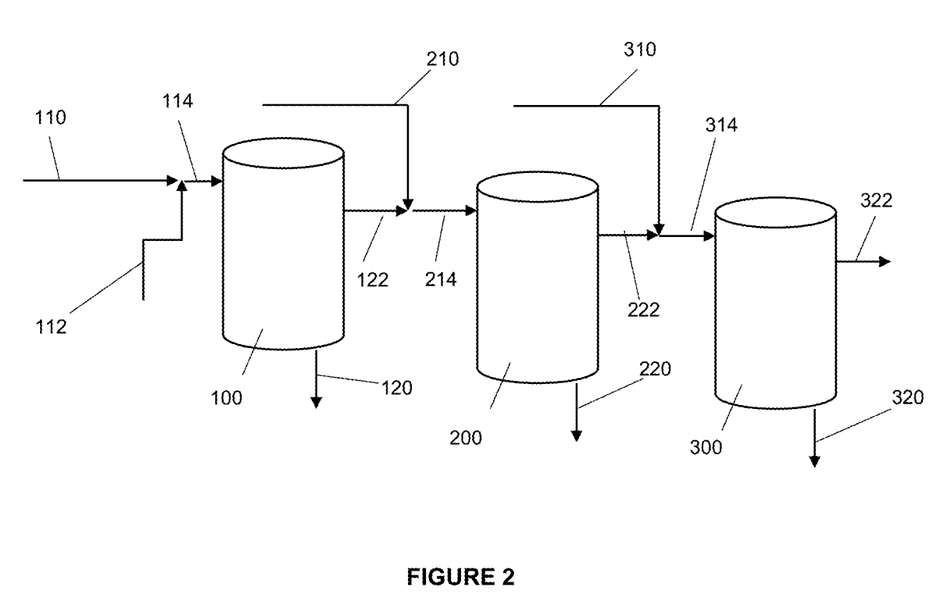
FIG. 2 depicts an embodiment of the invention having multiple zeolite synthesis reactions in series.

FIG. 2 shows yet another embodiment wherein the first feed stream 110 is combined with a mother liquor from an AEI synthesis process 112 to form a first AEI zeolite reaction admixture 114. The combination of the first feed stream and the mother liquor 112 can occur prior to being introduced into the reactor 100 or can occur within the reactor 100. The first AEI zeolite reaction admixture 114 is reacted in a reactor 100 under crystallization conditions to form a first batch of zeolite crystals having an AEI framework 120 and a first subsequent mother liquor 122. The first subsequent mother liquor 122 is combined with a first replenishment stream 210 to form a second AEI zeolite reaction admixture 214. The combination of the first feed stream and second the mother liquor 122 can occur prior to being introduced into the reactor 200 or can occur within the reactor 200. The second AEI zeolite reaction admixture 214 is reacted in a reactor 200 under crystallization conditions to form a second batch of zeolite crystals having an AEI framework 220 and a second subsequent mother liquor 222. The second subsequent mother liquor 222 is combined with a second replenishment stream 310 to form a third AEI zeolite reaction admixture 314. The combination of the second feed stream and third the mother liquor 222 can occur prior to being introduced into the reactor 300 or can occur within the reactor 300. The third AEI zeolite reaction admixture 314 is reacted in a reactor 300 under crystallization conditions to form a third batch of zeolite crystals having an AEI framework 320 and a second subsequent mother liquor 322.

The process shown in FIG. 2 involves three AEI zeolite syntheses performed in series wherein the mother liquor or a portion thereof from one AEI synthesis is reused in a subsequent AEI zeolite synthesis. However, the method of the present invention is not necessarily limited to a particular number of AEI zeolite syntheses and mother liquor reuses. Instead, the number of AEI zeolite syntheses and mother liquor reuses performed in series will depend upon the desired overall relative yield on reactants. In general, increasing the number of time the mother liquor is reused will increase the overall relative yield on the reactants. Preferably, the overall process will have an overall relative yield on silica of at least about 60%, for example at least about 75%, at least about 90%, at least about 95%, about 60-99%, about 60-80%, about 80-90%, about 90 99%, about 90-95%, or about 95-99%. Preferably, the overall process will have an overall relative yield on SDA of at least about 40%, for example at least about 60%, at least about 80%, at least about 90%, about 40-99%, about 40-60%, about 60-80%, about 80-90%, about 90-95%, or about 95-99%.

Suitable silica sources include, without limitation, fumed silica, silicates, precipitated silica, colloidal silica, silica gels, dealuminated zeolites such as dealuminated zeolite Y, and silicon hydroxides and alkoxides. Silica sources resulting in a high relative yield are preferred. Typical alumina sources also are generally known and include aluminates, alumina, other zeolites such as zeolite FAU, aluminum colloids, boehmites, pseudo-boehmites, aluminum hydroxides, aluminum salts such as aluminum sulfate and alumina chloride, aluminum hydroxides and alkoxides, alumina gels.

Typically, a source of hydroxide ions such as an alkali metal hydroxide and/or an alkaline earth metal hydroxide, including hydroxide of sodium, potassium, lithium, cesium, rubidium, calcium, and magnesium, is used in the reaction mixture. However, this component can be omitted so long as the equivalent basicity is maintained. In certain embodiments, the templating agent may be used to provide hydroxide on. Thus, it may be beneficial to on exchange, for example, the halide for hydroxide on, thereby reducing or eliminating the alkali metal hydroxide quantity required. The alkali metal cation or alkaline earth cation may be part of the as-synthesized crystalline oxide material, in order to balance valence electron charges therein.

Salts, particularly alkali metal halides such as sodium chloride, can be added to or formed in the reaction mixture as well. Preferably, the AEI zeolite reaction admixture is free or substantially free of fluorine, fluorine-containing compounds, and fluorine ions.

The reaction mixture can be in the form of a solution, gel, or paste, with a gel being preferred. AEI can be prepared from a reaction mixture having the composition shown in Table 1. Silicon- and aluminum-containing reactants are expressed as $SiO_2$ and $Al_2O_3$, respectively.

TABLE 1

|  | Typical | Preferred |
| --- | --- | --- |
| $SiO_2/Al2O_3$ | 10-100 | 15-60 |
| $OH^-/SiO_2$ | 0.5-1.0 | 0.6-0.8 |
| $SDA/SiO_2$ | 0.05-0.50 | 0.10-0.20 |
| Alkali metal cation/$SiO_2$ | 0.10-1.0 | 0.15-0.35 |
| $H_2O/SiO_2$ | 20-80 | 30-40 |

Preferably, the replenishment feed contains an amount of silica, alumina, SDA, alkali metal cation, and/or water to achieve the desired component rations when combined with a re-used mother liquor. In order to achieve an appropriate balance of components, the concentration of one or more components or by-products can be removed from the mother liquor before being combined with the replenishment feed. For example, the concentration of alkali metal cations or water may be reduced in the mother liquor to achieve a desired component ratio in the AEI synthesis reaction admixture.

Reaction temperatures, mixing times and speeds, and other process parameters that are suitable for conventional CHA synthesis techniques are also generally suitable for the present invention. Generally, the reaction mixture is maintained at an elevated temperature until the AEI zeolite crystals are formed. The hydrothermal crystallization is usually conducted under autogenous pressure, at a temperature between about 75-220° C., for example about 120 and 160° C., for a duration of several hours, for example, about 0.1-20 days, and preferably from about 0.25-3 days. Preferably, the zeolite is prepared using mild stirring or agitation.

During the hydrothermal crystallization step, the AEI crystals can be allowed to nucleate spontaneously from the reaction mixture. The use of AEI crystals as seed material can be advantageous in decreasing the time necessary for complete crystallization to occur. When used as seeds, AEI crystals are added in an amount between 0.1 and 10% of the weight of silica used in the reaction mixture.

Once the zeolite crystals have formed, the solid product is separated from the reaction mixture by standard mechanical separation techniques such as filtration. The crystals are water-washed and then dried, for several second to a few minutes (e.g., 5 second to 10 minutes for flash drying) or several hours (e.g., about 4-24 hours for oven drying at 75-150° C.), to obtain the as-synthesized AEI zeolite crystals. The drying step can be performed at atmospheric pressure or under vacuum.

It will be appreciated that the foregoing sequence of steps, as well as each of the above-mentioned periods of time and temperature values are merely exemplary and may be varied.

The synthesis method of the present invention produce a novel form of AEI zeolite crystals having a unique morphology for AEI-type zeolites. In particular, the novel AEI zeolite crystals has a mean Length-to-Diameter (L/D) Aspect Ratio of less than or equal to 3, for example, less than or equal to 2.5, less than or equal to 2.0, less than or equal to 1.5, less than or equal to 1.0. Preferably, the L/D Aspect Ratio is calculated based on measurements of these two crystal dimensions using the microscopy methods described below.

Preferred microscopy methods include SEM and TEM. These methods typically require measurements of a large number of crystals and, for each crystal measured, values may be evaluated in both dimensions. Furthermore, in order to more completely characterize the crystal size of a batch of crystals, the mean L/D Aspect Ratio should be calculated, as well as the degree of variance from this mean in terms of a crystal size distribution. For example, measurement by SEM involves examining the morphology of materials at high magnifications (typically 1000× to 10,000×). The SEM method can be performed by distributing a representative portion of the zeolite powder on a suitable mount such that individual particles are reasonably evenly spread out across the field of view at 1000× to 10,000× magnification. From this population, a statistically significant sample (n) of random individual crystals (e.g., 50) are examined and the longest dimension (disregarding twinning boundaries) of the individual crystals parallel to the horizontal line of the straight edge are measured and recorded as the crystal length. The diameter of the crystal along the length axis is then measured using similar techniques. Based on these measurements, the arithmetic mean and the variance of the sample are calculated. In certain embodiments, the sample also has a mathematical variance about the mean of less than 1, preferably less than 0.5, and even more preferably less than 0.2.

The AEI zeolite crystals produced in accordance with this process are uniform, have little to no twinning and/or multiple twinning, and have little agglomeration. The morphology, and particularly the low L/D ratio, of the crystals is expected to provide better catalytic performance in certain applications.

The AEI zeolite crystals produced in accordance with the methods described herein have a mean crystallite size of about 0.05 to about 5 μm, for example about 0.5 to about 5 μm, about 0.1 to about 1 μm, and about 1 to about 5 μm. In certain embodiments, large crystals are milled using a jet mill or other particle-on-particle milling technique to an average size of about 1.0 to about 1.5 micron to facilitate washcoating a slurry containing the catalyst to a substrate, such as a flow-through monolith.

AEI zeolites synthesized by the methods described herein preferably have a silica-to-alumina ratio (SAR) of at least 8, for example about 8 to about 50, about 10 to about 35, or about 15 to about 25. The SAR can be selectively achieved based on the composition of the starting synthesis mixture and/or adjusting other process variables. The silica-to-alumina ratio of zeolites may be determined by conventional analysis. This ratio is meant to represent, as closely as possible, the ratio in the rigid atomic framework of the zeolite crystal and to exclude silicon or aluminum in the binder (for catalyst applications) or, in cationic or other form, within the channels.

The AEI zeolite is useful as a catalyst in certain applications. The dried AEI crystals are preferably calcined, but can also be used without calcination. The AEI catalyst can also be used either without a post-synthesis metal exchange or with a post-synthesis metal exchange. Thus, in certain aspects of the invention, provided is a catalyst comprising an AEI zeolite, wherein the AEI zeolite is free or essentially free of any exchanged metal, particularly post-synthesis exchanged or impregnated metals. In other embodiments, provided is a catalyst comprising an AEI zeolite containing one or more catalytic metal ions exchanged or otherwise impregnated into the channels and/or cavities of the zeolite. Examples of metals that can be post-zeolite synthesis exchanged or impregnated include transition metals, including copper, nickel, zinc, iron, tungsten, molybdenum, cobalt, titanium, zirconium, manganese, chromium, vanadium, niobium, as well as tin, bismuth, and antimony; noble metals including platinum group metals (PGMs), such as ruthenium, rhodium, palladium, indium, platinum, and precious metals such as gold and silver; alkaline earth metals such as beryllium, magnesium, calcium, strontium, and barium; and rare earth metals such as lanthanum, cerium, praseodymium, neodymium, europium, terbium, erbium, ytterbium, and yttrium. Preferred transition metals for post-synthesis exchange are base metals, and preferred base metals include those selected from the group consisting of manganese, iron, cobalt, nickel, and mixtures thereof.

The transition metal can be present in an amount of about 0.1 to about 10 weight percent, for example about 0.5 to about 5 weigh percent, about 0.1 to about 1.0 weight percent, about 2.5 to about 3.5 weight percent, and about 4.5 to about 5.5 weight percent, wherein the weight percent is relative to the total weight of the zeolite material.

Particularly preferred exchanged metals include copper and iron, particularly when combined with calcium and/or cerium and particularly when the transition metals ($T_M$) and the alkaline metals ($A_M$) are present in a $T_M:A_M$ molar ratio of about 15:1 to about 1:1, for example about 10:1 to about 2:1, about 10:1 to about 3:1, or about 6:1 to about 4:1, Metals incorporated post-synthesis can be added to the molecular sieve via any known technique such as ion exchange, impregnation, isomorphous substitution, etc.

These exchanged metal cations are distinct from metals constituting the molecular framework of the zeolite, and thus metal exchanged zeolites are distinct from metal-substituted zeolites.

For embodiments in which the catalyst is part of a washcoat composition, the washcoat may further comprise binder containing Ce or eerie. For such embodiments, the Ce containing particles in the binder are significantly larger than the Ce containing particles in the catalyst.

Catalysts of the present invention are particularly applicable for heterogeneous catalytic reaction systems (i.e., solid catalyst in contact with a gas reactant). To improve contact surface area, mechanical stability, and/or fluid flow characteristics, the catalysts can be disposed on and/or within a substrate, preferably a porous substrate. In certain embodiments, a washcoat containing the catalyst is applied to an inert substrate, such as corrugated metal plate or a honeycomb cordierite brick. Alternatively, the catalyst is kneaded along with other components such as fillers, binders, and reinforcing agents, into an extrudable paste which is then extruded through a die to form a honeycomb brick. Accordingly, in certain embodiments provided is a catalyst article comprising an AEI catalyst described herein coated on and/or incorporated into a substrate.

Certain aspects of the invention provide a catalytic washcoat. The washcoat comprising the AEI catalyst described herein is preferably a solution, suspension, or slurry. Suitable coatings include surface coatings, coatings that penetrate a portion of the substrate, coatings that permeate the substrate, or some combination thereof.

A washcoat can also include non-catalytic components, such as fillers, binders, stabilizers, rheology modifiers, and other additives, including one or more of alumina, silica, non-zeolite silica alumina, titania, zirconia, ceria. In certain embodiments, the catalyst composition may comprise pore-forming agents such as graphite, cellulose, starch, polyacrylate, and polyethylene, and the like. These additional components do not necessarily catalyze the desired reaction, but instead improve the catalytic material's effectiveness, for example, by increasing its operating temperature range, increasing contact surface area of the catalyst, increasing adherence of the catalyst to a substrate, etc. In preferred embodiments, the washcoat loading is >0.3 g/in$^3$, such as >1.2 g/in$^3$, >1.5 g/in$^3$, >1.7 g/in$^3$ or >2.00 g/in$^3$, and preferably <3.5 g/in$^3$, such as <2.5 g/in$^3$. In certain embodiments, the washcoat is applied to a substrate in a loading of about 0.8 to 1.0 g/in$^3$, 1.0 to 1.5 g/in$^3$, or 1.5 to 2.5 g/in$^3$.

Two of the most common substrate designs to which catalyst may be applied are plate and honeycomb. Preferred substrates, particularly for mobile applications, include flow-through monoliths having a so-called honeycomb geometry that comprise multiple adjacent, parallel channels that are open on both ends and generally extend from the inlet face to the outlet face of the substrate and result in a high-surface area-to-volume ratio. For certain applications, the honeycomb flow-through monolith preferably has a high cell density, for example about 600 to 800 cells per square inch, and/or an average internal wall thickness of about 0.18-0.35 mm, preferably about 0.20-0.25 mm. For certain other applications, the honeycomb flow-through monolith preferably has a low cell density of about 150-600 cells per square inch, more preferably about 200-400 cells per square inch. Preferably, the honeycomb monoliths are porous. In addition to cordierite, silicon carbide, silicon nitride, ceramic, and metal, other materials that can be used for the substrate include aluminum nitride, silicon nitride, aluminum titanate, α-alumina, mullite, e.g., acicular mullite, pollucite, a thermet such as $Al_2OsZFe$, $Al_2O_3$/Ni or $B_4CZFe$, or composites comprising segments of any two or more thereof. Preferred materials include cordierite, silicon carbide, and alumina titanate.

Plate-type catalysts have lower pressure drops and are less susceptible to plugging and fouling than the honeycomb types, which is advantageous in high efficiency stationary applications, but plate configurations can be much larger and more expensive. A honeycomb configuration is typically smaller than a plate type, which is an advantage in mobile applications, but has higher pressure drops and plug more easily. In certain embodiments the plate substrate is constructed of metal, preferably corrugated metal.

In certain embodiments, the invention is a catalyst article made by a process described herein. In a particular embodiment, the catalyst article is produced by a process that includes the steps of applying an AEI catalyst composition, preferably as a washcoat, to a substrate as a layer either before or after at least one additional layer of another composition for treating exhaust gas has been applied to the substrate. The one or more catalyst layers on the substrate, including the AEI catalyst layer, are arranged in consecutive layers. As used herein, the term "consecutive" with respect to catalyst layers on a substrate means that each layer is contact with its adjacent layer(s) and that the catalyst layers as a whole are arranged one on top of another on the substrate.

In certain embodiments, the AEI catalyst is disposed on the substrate as a first layer or zone and another composition, such as an oxidation catalyst, reduction catalyst, scavenging component, or NO$_x$ storage component, is disposed on the substrate as a second layer or zone. As used herein the terms "first layer" and "second layer" are used to describe the relative positions of catalyst layers in the catalyst article with respect to the normal direction of exhaust gas flow-through, past, and/or over the catalyst article. Under normal exhaust gas flow conditions, exhaust gas contacts the first layer prior to contacting the second layer. In certain embodiments, the second layer is applied to an inert substrate as a bottom layer and the first layer is top layer that is applied over the second layer as a consecutive series of sub-layers. In such embodiments, the exhaust gas penetrates (and hence contacts) the first layer, before contacting the second layer, and subsequently returns through the first layer to exit the catalyst component. In other embodiments, the first layer is a first zone disposed on an upstream portion of the substrate and the second layer is disposed on the substrate as a second zone, wherein the second zone is downstream of the first.

In another embodiment, the catalyst article is produced by a process that includes the steps of applying an AEI catalyst composition, preferably as a washcoat, to a substrate as a first zone, and subsequently applying at least one additional composition for treating an exhaust gas to the substrate as a second zone, wherein at least a portion of the first zone is downstream of the second zone. Alternatively, the AEI catalyst composition can be applied to the substrate in a second zone that is downstream of a first zone containing the additional composition. Examples of additional compositions include oxidation catalysts, reduction catalysts, scavenging components (e.g., for sulfur, water, etc.), or NO$_x$ storage components.

To reduce the amount of space required for an exhaust system, individual exhaust components in certain embodiments are designed to perform more than one function. For example, applying an SCR catalyst to a wall-flow filter substrate instead of a flow-through substrate serves to reduce the overall size of an exhaust treatment system by allowing one substrate to serve two functions, namely catalytically reducing NO$_x$ concentration in the exhaust gas and mechanically removing soot from the exhaust gas. Accordingly, in certain embodiments, the substrate is a honeycomb wall-flow filter or partial filter. Wall-flow filters are similar to flow-through honeycomb substrates in that they contain a plurality of adjacent, parallel channels. However, the channels of flow-through honeycomb substrates are open at both ends, whereas the channels of wall-flow substrates have one end capped, wherein the capping occurs on opposite ends of adjacent channels in an alternating pattern. Capping alternating ends of channels prevents the gas entering the inlet face of the substrate from flowing straight through the channel and existing. Instead, the exhaust gas enters the front of the substrate and travels into about half of the channels where it is forced through the channel walls prior to entering the second half of the channels and exiting the back face of the substrate.

The substrate wall has a porosity and pore size that is gas permeable, but traps a major portion of the particulate matter, such as soot, from the gas as the gas passes through the wall. Preferred wall-flow substrates are high efficiency filters. Wall flow filters for use with the present invention preferably have an efficiency of least 70%, at least about 75%, at least about 80%, or at least about 90%. In certain embodiments, the efficiency will be from about 75 to about 99%, about 75 to about 90%, about 80 to about 90%, or about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns.

Porosity is a measure of the percentage of void space in a porous substrate and is related to backpressure in an exhaust system: generally, the lower the porosity, the higher the backpressure. Preferably, the porous substrate has a porosity of about 30 to about 80%, for example about 40 to about 75%, about 40 to about 65%, or from about 50 to about 60%.

The pore interconnectivity, measured as a percentage of the substrate's total void volume, is the degree to which pores, void, and/or channels, are joined to form continuous paths through a porous substrate, i.e., from the inlet face to the outlet face. In contrast to pore interconnectivity is the sum of closed pore volume and the volume of pores that have a conduit to only one of the surfaces of the substrate. Preferably, the porous substrate has a pore interconnectivity volume of at least about 30%, more preferably at least about 40%.

The mean pore size of the porous substrate is also important for filtration. Mean pore size can be determined by any acceptable means, including by mercury porosimetry. The mean pore size of the porous substrate should be of a high enough value to promote low backpressure, while providing an adequate efficiency by either the substrate per se, by promotion of a soot cake layer on the surface of the substrate, or combination of both. Preferred porous substrates have a mean pore size of about 10 to about 40 μm, for example about 20 to about 30 μm, about 10 to about 25 μm, about 10 to about 20 μm, about 20 to about 25 μm, about 10 to about 15 μm, and about 15 to about 20 μm.

In general, the production of an extruded solid body, such as honeycomb flow-through or wall-flow filter, containing the AEI catalyst involves blending the AEI catalyst, a binder, an optional organic viscosity-enhancing compound into an homogeneous paste which is then added to a binder/matrix component or a precursor thereof and optionally one or more of stabilized ceria, and inorganic fibers. The blend is compacted in a mixing or kneading apparatus or an extruder. The mixtures have organic additives such as binders, pore formers, plasticizers, surfactants, lubricants, dispersants as processing aids to enhance wetting and therefore produce a uniform batch. The resulting plastic material is then molded, in particular using an extrusion press or an extruder including an extrusion die, and the resulting moldings are dried and calcined. The organic additives are "burnt out" during calcinations of the extruded solid body. An AEI zeolite catalyst may also be washcoated or otherwise applied to the extruded solid body as one or more sub-layers that reside on the surface or penetrate wholly or partly into the extruded solid body.

The binder/matrix component is preferably selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. The paste can optionally contain reinforcing inorganic fibers selected from the group consisting of carbon fibers, glass fibers, metal fibers, boron fibers, alumina fibers, silica fibers, silica-alumina fibers, silicon carbide fibers, potassium titanate fibers, aluminum borate fibers and ceramic fibers.

The alumina binder/matrix component is preferably gamma alumina, but can be any other transition alumina, i.e., alpha alumina, beta alumina, chi alumina, eta alumina, rho alumina, kappa alumina, theta alumina, delta alumina, lanthanum beta alumina and mixtures of any two or more such transition aluminas. It is preferred that the alumina is doped with at least one non-aluminum element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Preferably, the AEI catalyst is dispersed throughout, and preferably evenly throughout, the entire extruded catalyst body.

Where any of the above extruded solid bodies are made into a wall-flow filter, the porosity of the wall-flow filter can be from 30-80%, such as from 40-70%. Porosity and pore volume and pore radius can be measured e.g. using mercury intrusion porosimetry.

The AEI catalyst described herein can promote the reaction of a reductant, preferably ammonia, with nitrogen oxides to selectively form elemental nitrogen ($N_2$) and water ($H_2O$). Thus, in one embodiment, the catalyst can be formulated to favor the reduction of nitrogen oxides with a reductant (i.e., an SCR catalyst). Examples of such reductants include hydrocarbons (e.g., C3-C6 hydrocarbons) and nitrogenous reductants such as ammonia and ammonia hydrazine or any suitable ammonia precursor, such as urea (($NH_2)_2CO$), ammonium carbonate, ammonium carbamate, ammonium hydrogen carbonate or ammonium formate.

The AEI catalyst described herein can also promote the oxidation of ammonia. Thus, in another embodiment, the catalyst can be formulated to favor the oxidation of ammonia with oxygen, particularly a concentrations of ammonia typically encountered downstream of an SCR catalyst (e.g., ammonia oxidation (AMOX) catalyst, such as an ammonia slip catalyst (ASC)). In certain embodiments, the AEI catalyst is disposed as a top layer over an oxidative under-layer, wherein the under-layer comprises a platinum group metal (PGM) catalyst or a non-PGM catalyst. Preferably, the catalyst component in the underlayer is disposed on a high surface area support, including but not limited to alumina.

In yet another embodiment, an SCR and AMOX operations are performed in series, wherein both processes utilize a catalyst comprising the AEI catalyst described herein, and wherein the SCR process occurs upstream of the AMOX process. For example, an SCR formulation of the catalyst can be disposed on the inlet side of a filter and an AMOX formulation of the catalyst can be disposed on the outlet side of the filter.

Accordingly, provided is a method for the reduction of $NO_x$ compounds or oxidation of $NH_3$ in a gas, which comprises contacting the gas with a catalyst composition described herein for the catalytic reduction of $NO_x$ compounds for a time sufficient to reduce the level of $NO_x$ compounds and/or $NH_3$ in the gas. In certain embodiments, provided is a catalyst article having an ammonia slip catalyst disposed downstream of a selective catalytic reduction (SCR) catalyst. In such embodiments, the ammonia slip catalyst oxidizes at least a portion of any nitrogenous reductant that is not consumed by the selective catalytic reduction process. For example, in certain embodiments, the ammonia slip catalyst is disposed on the outlet side of a wall flow filter and an SCR catalyst is disposed on the upstream side of a filter. In certain other embodiments, the ammonia slip catalyst is disposed on the downstream end of a flow-through substrate and an SCR catalyst is disposed on the upstream end of the flow-through substrate. In other embodiments, the ammonia slip catalyst and SCR catalyst are disposed on separate bricks within the exhaust system. These separate bricks can be adjacent to, and in contact with, each other or separated by a specific distance, provided that they are in fluid communication with each other and provided that the SCR catalyst brick is disposed upstream of the ammonia slip catalyst brick.

In certain embodiments, the SCR and/or AMOX process is performed at a temperature of at least 100° C. In another embodiment, the process(es) occur at a temperature from about 150° C. to about 750° C. In a particular embodiment, the temperature range is from about 175 to about 550° C. In another embodiment, the temperature range is from 175 to 400° C. In yet another embodiment, the temperature range is 450 to 900° C., preferably 500 to 750° C., 500 to 650° C., 450 to 550° C., or 650 to 850° C. Embodiments utilizing temperatures greater than 450° C. are particularly useful for treating exhaust gases from a heavy and light duty diesel engine that is equipped with an exhaust system comprising (optionally catalyzed) diesel particulate filters which are regenerated actively, e.g. by injecting hydrocarbon into the exhaust system upstream of the filter, wherein the zeolite catalyst for use in the present invention is located downstream of the filter.

According to another aspect of the invention, provided is a method for the reduction of $NO_x$ compounds and/or oxidation of $NH_3$ in a gas, which comprises contacting the gas with a catalyst described herein for a time sufficient to reduce the level of $NO_x$ compounds in the gas. Methods of the present invention may comprise one or more of the following steps: (a) accumulating and/or combusting soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst or lean $NO_x$ trap, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the $NO_x$ concentration in the exhaust gas; and (f) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

In another embodiment, all or at least a portion of the nitrogen-based reductant, particularly $NH_3$, for consumption in the SCR process can be supplied by a $NO_x$ adsorber catalyst (NAC), a lean $NO_x$ trap (LNT), or a $NO_x$ storage/reduction catalyst (NSRC), disposed upstream of the SCR catalyst, e.g., a SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 g/ft$^3$, such as 20 to 60 g/ft$^3$. Alternatively, the precious metal of the catalyst is characterized by the average concentration which may be from about 40 to about 100 grams/ft$^3$.

Under certain conditions, during the periodically rich regeneration events, NH$_3$ may be generated over a NO$_x$ adsorber catalyst. The SCR catalyst downstream of the NO$_x$ adsorber catalyst may improve the overall system NO$_x$ reduction efficiency. In the combined system, the SCR catalyst is capable of storing the released NH$_3$ from the NAC catalyst during rich regeneration events and utilizes the stored NH$_3$ to selectively reduce some or all of the NO$_x$ that slips through the NAC catalyst during the normal lean operation conditions.

The method for treating exhaust gas as described herein can be performed on an exhaust gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

In certain aspects, the invention is a system for treating exhaust gas generated by combustion process, such as from an internal combustion engine (whether mobile or stationary), a gas turbine, coal or oil fired power plants, and the like. Such systems include a catalytic article comprising the AEI catalyst described herein and at least one additional component for treating the exhaust gas, wherein the catalytic article and at least one additional component are designed to function as a coherent unit.

In certain embodiments, the system comprises a catalytic article comprising an AEI catalyst described herein, a conduit for directing a flowing exhaust gas, a source of nitrogenous reductant disposed upstream of the catalytic article. The system can include a controller for the metering the nitrogenous reductant into the flowing exhaust gas only when it is determined that the zeolite catalyst is capable of catalyzing NO$_x$ reduction at or above a desired efficiency, such as at above 100° C., above 150° C. or above 175° C. The metering of the nitrogenous reductant can be arranged such that 60% to 200% of theoretical ammonia is present in exhaust gas entering the SCR catalyst calculated at 1:1 NH$_3$/NO and 4:3 NH$_3$/NO$_2$.

In another embodiment, the system comprises an oxidation catalyst (e.g., a diesel oxidation catalyst (DOC)) for oxidizing nitrogen monoxide in the exhaust gas to nitrogen dioxide can be located upstream of a point of metering the nitrogenous reductant into the exhaust gas. In one embodiment, the oxidation catalyst is adapted to yield a gas stream entering the SCR zeolite catalyst having a ratio of NO to NO$_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. In one embodiment, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

In a further embodiment, a suitable filter substrate is located between the oxidation catalyst and the SCR catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the zeolite catalyst. Alternatively, if the filter is un-catalyzed, the means for metering nitrogenous reductant can be located between the oxidation catalyst and the filter.

EXAMPLES

Example: Synthesis of AEI Zeolite Using N,N-Dimethyl-3,5-dimethylpiperidinium in Recycle Mother Liquor About 36 grams of dealuminated USY zeolite with an SAR of 10.7 is mixed with about 1093 grams of water. To this mixture, about 195 grams of N,N-Dimethyl-3,5-dimethylpiperidinium templating agent and about 427 grams of liquid sodium silicate (28.8 wt % SiO$_2$) is slowly poured into the above mixture under agitation. The resulting mixture is then heated to 145° C. in sealed stainless steel reactor with 200 rpm agitation. After 2 days of crystallization, the resulting crystallized mixture is transferred to a separation funnel. At static conditions, the solid settlement and a top clear liquid layer are separated in several hours. The bulk of the clear mother liquor is collected and designated as first pass mother liquor (ML-P1).

The solid in the bottom slurry is recovered and confirmed to be AEI by XRD. Chemical analysis of this product shows its SAR to be 20.0. Analysis of the mother liquor indicates no detectable decomposition of the un-utilized template after the synthesis.

About 38 grams of dealuminated USY zeolite with and SAR 30 and about 21 grams of USY zeolite with an SAR of 10.7 are mixed with 1582 grams of ML-P1. To this mixture, about 45 grams of N,N-Dimethyl-3,5-dimethylpiperidinium templating agent and about 31 grams of water are added sequentially. Under agitation, about 34 grams of liquid sodium silicate (28.8 wt % SiO$_2$) is slowly poured into the above mixture. The reaction admixture is then heated to about 145° C. in a stainless steel reactor with 200 rpm agitation. After 20-35 hours of crystallization, the resulting solid was removed and verified by XRD to be AEI zeolite. Chemical analysis of the product shows its SAR to be 20.0. The mother liquor is collected and designated as second pass mother liquor (ML-P2). The ML-P2 is utilized in a similar manner to generate ML-P3, and in turn, ML-P3 was used to generate ML-P4, and ML-P4 was used to generate ML-P5.

The results of these synthesis tests are provided in Table 2.

TABLE 2

| | Reaction Admixture Gel Composition | Crystallized Product | Overall Zeolite Relative Yield | Mother Liquor | Overall Relative Yield on Template | Overall Relative Yield on Silica |
|---|---|---|---|---|---|---|
| Base Synthesis | 60.0 $SiO_2$<br>2.0 $Al_2O_3$<br>14.9 $Na_2O$<br>9.4 $R_HOH$<br>2000 $H_2O$ | AEI<br>SAR = 20.0 | | ML-P1 | 22% | 34% |
| ML-P1 (94 wt. %) plus replenishment | 60.0 $SiO_2$<br>2.0 $Al_2O_3$<br>14.9 $Na_2O$<br>9.4 $R_HOH$<br>2000 $H_2O$ | AEI<br>SAR = 20.0 | 15% | ML-P2 | 25% | 38% |
| ML-P2 (94 wt. %) plus replenishment | 60.0 $SiO_2$<br>2.0 $Al_2O_3$<br>14.9 $Na_2O$<br>9.4 $R_HOH$<br>2000 $H_2O$ | AEI<br>SAR = 20.0 | 40% | ML-P3 | 34% | 48% |
| ML-P3 (94 wt. %) plus replenishment | 60.0 $SiO_2$<br>2.0 $Al_2O_3$<br>14.9 $Na_2O$<br>9.4 $R_HOH$<br>2000 $H_2O$ | AEI<br>SAR = 20.0 | 75% | ML-P4 | 53% | 67% |
| ML-P4 (94 wt. %) plus replenishment | 60.0 $SiO_2$<br>2.0 $Al_2O_3$<br>14.9 $Na_2O$<br>9.4 $R_HOH$<br>2000 $H_2O$ | AEI<br>SAR = 20.0 | 94% | ML-P5 | 85% | 91% |

These results show that the N,N-Dimethyl-3,5-dimethylpiperidinium templating agent can be recycled multiple times to increase both the overall relative yield on silica and the overall relative yield on SDA. Comparable results can be obtained by varying the percentage of recycled mother liquor, the composition of the gel, the number of recycle iterations, and the reaction parameters such as temperature, time, agitation rate, and pressure. In addition, the composition of the gel and process parameters can be varied to obtain AEI zeolite crystals having different properties, such as different SAR values.

Comparative Example: Synthesis of AEI Zeolite Using N,N-Diethyl-2,6-dimetylpiperidinium About 35 grams of dealuminated USY zeolite with an SAR of 10.7 is mixed with about 9548 grams of water. To this mixture, about 302 grams of N,N-Diethyl-2,6-dimetylpiperidinium templating agent and about 415 grams of liquid sodium silicate (28.8 wt % $SiO_2$) is slowly poured into the above mixture under agitation. The resulting mixture is then heated to 145° C. in sealed stainless steel reactor with 200 rpm agitation. After 7 days of crystallization, the resulting crystallized mixture is transferred to a separation funnel. After 2-4 days of static settling, the bottom settlement and a top clear liquid layer are well separated. The top clear liquid layer contains an aqueous bottom portion and a thin oil-like layer separated into a top portion.

The solid in the bottom slurry is recovered and confirmed to be AEI by XRD. Chemical analysis of this product shows its SAR to be 25.2. Analysis of the aqueous bottom portion of the mother liquor indicates that 35-40% of the un-utilized templating agent is decomposed. Analysis of the top oil-like portion shows mainly molecules consistent with decomposition of the templating agent.

These results show that the mother liquor derived from an AEI zeolite synthesis reaction using the conventional templating agent N,N-Diethyl-2,6-dimetylpiperidinium, cannot be effectively reused in sequential AEI zeolite synthesis batches. In contrast, when N,N-Dimethyl-3,5-dimethylpiperidinium is used as a templating agent for an AEI synthesis reaction, the mother liquor can be re-used in sequential AEI zeolite synthesis batches.

What is claimed is:

1. A washcoat comprising AEI zeolite crystals having a mean aspect ratio (L/D) of less than or equal to about 3 and a mean crystallite size of about 1 to about 1.5 microns, wherein the AEI zeolite comprises phosphorous in an amount less than 0.1 weight percent based on the total weight of the zeolite.

2. The washcoat of claim 1, wherein the alumniosilicate AEI zeolite crystals have a mean aspect ratio (L/D) of less than or equal to 2.0.

3. The washcoat of claim 1, wherein the aluminosilicate AEI zeolite crystals have a silica-to-alumina ratio of about 10 to about 35.

4. The washcoat of claim 1, wherein the aluminosilicate AEI zeolite crystals have a silica-to-alumina ratio of about 15 to about 25.

5. The washcoat of claim 1, wherein the aluminosilicate AEI zeolite crystals contain post-synthesis exchanged ions of one or more transition metals.

6. The washcoat of claim 5, wherein the transition metals comprise at least one metal selected from the group consisting of manganese, iron, cobalt, nickel, and mixtures thereof.

7. The washcoat of claim 5, wherein the post-synthesis exchanged ions of one or more transition metals are present in an amount of about 0.1 to about 10 weight percent.

8. The washcoat of claim 1, wherein the aluminosilicate zeolite contains about 0.5 to 5 weight percent post-synthesis exchanged copper ions, based on the total weight of the zeolite.

* * * * *